(No Model.)
K. WRIGHT.
SURFACE GAGE.
No. 303,782. Patented Aug. 19, 1884.
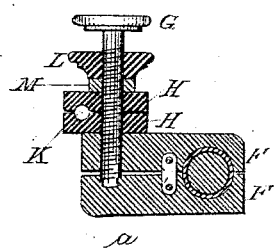
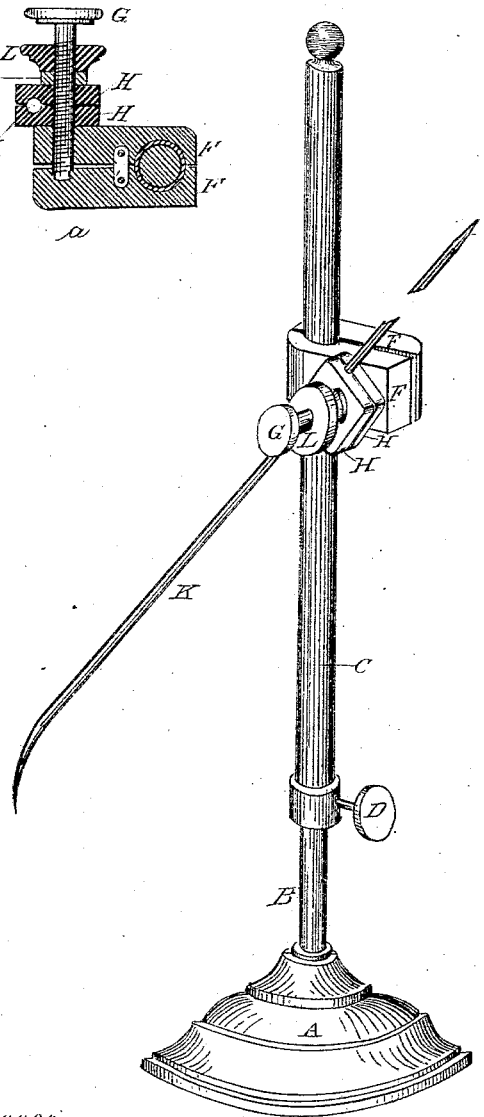
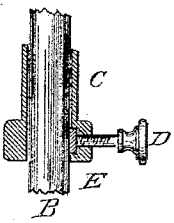
Witnesses
J. S. Acker
Wm H. Hendrickson
Inventor
Kelso Wright
by David A. Burr
Attorney

UNITED STATES PATENT OFFICE.

KELSO WRIGHT, OF ANSONIA, CONNECTICUT.

SURFACE-GAGE.

SPECIFICATION forming part of Letters Patent No. 303,782, dated August 19, 1884.

Application filed April 28, 1884. (No model.)

*To all whom it may concern:*

Be it known that I, KELSO WRIGHT, of Ansonia, in the county of New Haven and State of Connecticut, have invented a new and useful Improvement in Surface-Gages; and I do hereby declare that the following is a full and exact description thereof, reference being had to the accompanying drawings, and to the letters of reference marked thereon, making a part of this specification.

My invention relates to a surface-gage or device for testing the accuracy of planed or turned surfaces; and it has for its object to provide, in compact form, a gage which shall admit of ready adjustment, so as to adapt it for use with all manner of work.

It consists in the combination of a gage rod or pointer with a standard constructed telescopically to admit of extension or contraction, and to which it is secured by means of a clamping device adapted to move upon and be made fast to the standard at any desired point, the clamping device being constructed to permit of a ready adjustment of the pointer both longitudinally and at any desired angle of inclination, as hereinafter described.

In the accompanying drawings, Figure 1 is a perspective view of my improved surface-gage; Fig. 2, a sectional view on an enlarged scale of the clamping device for securing the pointer to the standard; and Fig. 3, a sectional view on an enlarged scale, illustrating the arrangement of the set-screw in the standard.

A represents the base of the standard; B, its upright rod secured to the base, and C a tubular rod fitted upon the fixed rod B, to move longitudinally thereon and form a telescopic joint therewith. The standard admits of extension by drawing out the upper outer tubular section, C, which, when adjusted, is made fast to the inner rod, B, by means of a set-screw, D, working against a loose plate, E, interposed between it and the rod B, in a suitable recess within the tubular section C, as shown in Fig. 3. This plate serves to protect the rod B from becoming marred by the screw, and to afford an extended frictional bearing sufficient to lock the joint and fix the rods together.

Upon the outer tubular section, C, of the standard a clamping device is fitted, consisting of two jaws or plates, F F, slightly separated and kept apart by a hinge, *a*, (see Fig. 2,) interposed between them, so as to unite the two, and upon which the two plates rock, so that when brought together at either end their opposite ends are thereby spread apart. The opposite contiguous faces of the ends of the two plates constituting the jaws are recessed to embrace closely the tubular section C. A threaded opening is pierced through the opposite end of one of the plates to receive the end of a thumb-screw, G, which, working through said opening in the one plate, will bear against the opposite plate, and, by forcing the two plates apart at their outer ends, will cause the jaws embracing the standard C to close thereon and clamp the same.

Upon the body of the screw G are fitted loosely two plates, H H, whose opposite contiguous faces on one side of the screw are each recessed to form between them a cylindrical opening adapted to receive the gage-rod or pointer K. The diameter of the gage-rod is slightly greater than that of the aperture formed between the two plates when they are closed together, so that as they are closed upon the rod they will firmly bind and clamp the same to hold it firmly in position. These clamp-plates H H are thus drawn together to clamp the gage-rod by means of a thumb-nut, L, running upon the screw G outside of the plates, a washer, M, (see Fig. 2,) being interposed between the nut and outer plate to prevent any displacement of the latter after its adjustment by the turning of the nut.

In using this improved gage, if it be not long enough at its ordinary length, when placed upon the bed-plate of the machine, to reach the work, the set-screw D is loosened and the outer section, C, drawn out until the standard is lengthened, as required. It is then fixed at this height by means of the set-screw, so as to serve, in fact, as a solid standard, upon which the gage-pointer is next adjusted.

By loosening the thumb-screw G, the clamping device carrying the pointer may be revolved or turned to the right or left upon the standard in a horizontal plane, as well as raised or lowered to bring the pointer to the desired position; and by loosing the nut L a longitudinal adjustment may be made of the pointer rod by sliding it in or out within the clamping device, while the rod may be turned upon the screw as its axis to any desired angle of inclination in a vertical plane. When adjusted, the gage or pointer-rod is quickly fixed by screwing up the screw G and the nut L upon the screw.

I claim as my invention—

In a gage for testing surfaces, the combination, with an upright standard and base, of a clamping device consisting of two plates, F F, hinged together centrally, so as to form at one end jaws adapted to clamp the standard, a screw led through the opposite outer end of one of the plates to bear against the other and close the jaws, two parallel plates, H H, turning loosely upon the screw and adapted to embrace between them the gage-rod or pointer K, and a nut, L, running upon the screw to bear against the plates H H and clamp them together upon the gage-rod and against the jaw-plate engaged by the screw, all substantially in the manner and for the purpose herein set forth.

In testimony whereof I have signed my name to this specification in the presence of two subscribing witnesses.

KELSO WRIGHT.

Witnesses:
E. BARTLETT,
CHARLES EASTOP.